Figure 1:
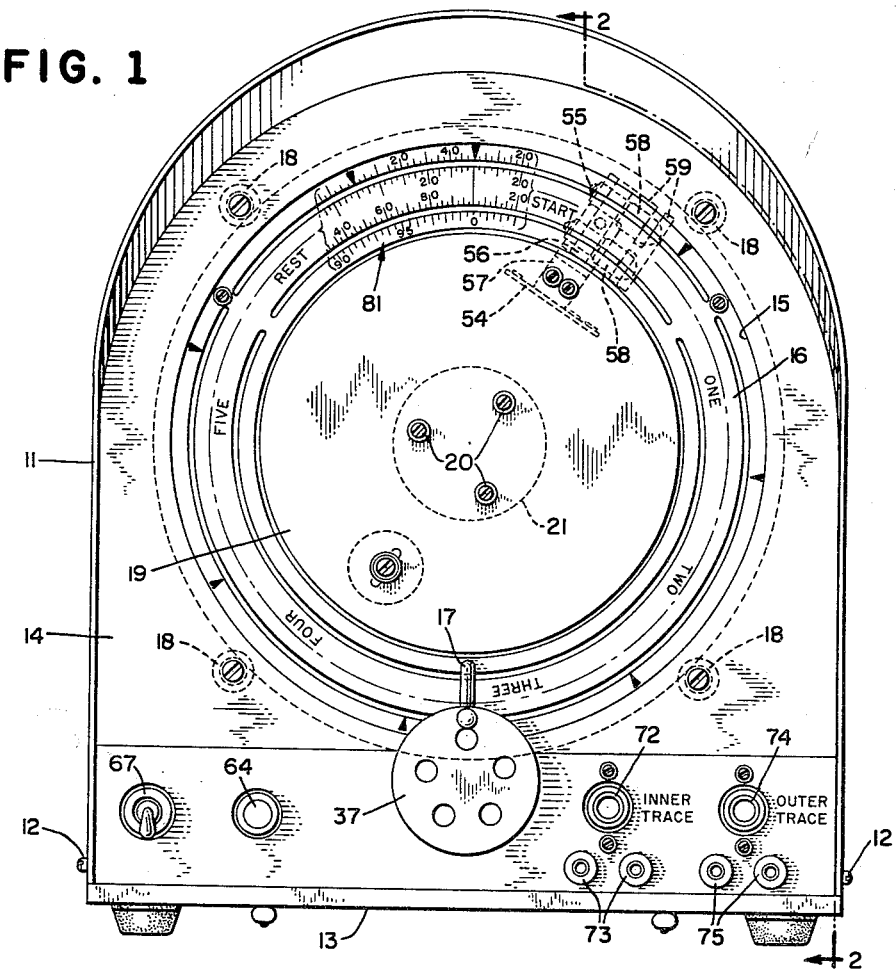

Feb. 23, 1965

W. V. JOHNSON ETAL 3,170,989

TELEGRAPH SIGNAL DISPLAY DEVICE

Filed Aug. 8, 1962

3 Sheets-Sheet 1

INVENTORS
WILLIAM V. JOHNSON
ANTHONY J. SCIMECA

BY R.H. Henderson

ATTORNEY

Feb. 23, 1965    W. V. JOHNSON ETAL    3,170,989
TELEGRAPH SIGNAL DISPLAY DEVICE
Filed Aug. 8, 1962    3 Sheets-Sheet 2

INVENTORS
WILLIAM V. JOHNSON
ANTHONY J. SCIMECA
BY
*J.H.Henderson*
ATTORNEY

INVENTORS
WILLIAM V. JOHNSON
ANTHONY J. SCIMECA
BY
*Henderson*
ATTORNEY

United States Patent Office 3,170,989
Patented Feb. 23, 1965

3,170,989
TELEGRAPH SIGNAL DISPLAY DEVICE
William V. Johnson, West Orange, and Anthony J. Scimeca, Old Bridge, N.J., assignors to The Western Union Telegraph Company, New York, N.Y., a corporation of New York
Filed Aug. 8, 1962, Ser. No. 215,667
10 Claims. (Cl. 178—69)

This invention relates to automatic telegraph code transmitting and receiving equipment, and more particularly to a novel device for the inspection, adjustment, and repair of such equipment.

Telegraph printers of the asychronous or "stop-start" type receive intelligence pulses from the line as separate successive transmissions of five time-sequential bit-coded pulses per character. Phase correspondence of the transmitter and receiver is established by the transmission of a "start" pulse at the beginning of each such character, but more exact synchronization beyond a rough correspondence of speed during the succeeding five pulses is unnecessary, although for purposes of adjustment, it remains the optimum setting to be achieved.

Since the printer is not required to operate at any exact speed in order to perform properly for either transmission or reception, a functional display of its operating characteristics in the time domain, as needed, for example, for servicing and for verification of adjustment, has been attended with some difficulty.

The translation of sequential pulse-time code signals into simultaneous multi-circuit discrete character indicia for printing, and the reverse translation for transmission, are accomplished by a rotating distributor in the printer, whose successive phase periods of receptivity for the intelligence pulses, for example, must be very accurately adjusted.

Prior equipment designed to provide for adjusting telegraph instruments has included rotating indicator lamps for connection to the transmitter which were driven by motors having a speed-adjusting device such as a variable resistor, to enable them to be brought into speed synchronism with the instrument under investigation. Probably as a result of line voltage variations and changes in bearing friction but from whatever cause, it has been found that the stability of such an arrangement is inadequate, and its adjustment to synchronism with the instrument very difficult. It should be observed that for purposes of precisely adjusting the telegraph instrument, it is necessary for the rotating indicator lamp to repeat its indication at precisely the same orientation upon every revolution, as accurate measurement of its "on" period will otherwise be impossible.

It is further to be observed that if any substantial creep or apparent motion of the repetitive "on" indication of the rotating lamp occurs, such as would be occasioned necessarily by a difference in rotational speed between the lamp and the distributor of the telegraph instrument, then any observation which one could make of the length of the "on" period would be erroneous because of the relative motion, which causes the luminous trace of the lamp to lengthen or shorten according to the extent of the creep.

Arrangements have been devised which have employed synchronously driven motors coupled to rotating indicator lamps by means of change gears. Aside from the obvious complication and expense of such a gear change mechanism, it is apparent that only intgral tooth ratios may be employed in attaining a desired speed ratio, so that an approximation of a desired speed is the best result attainable, and the closeness of the approximation depends entirely upon the complexity of the gearing in providing a large number of available tooth ratios.

These difficulties we overcome in the instant invention by providing a rotating indicator lamp assembly which is propelled by a substantially constant speed motor and coupled thereto by means of a variable speed friction drive which is adjustable so as to provide a complete range of speed adjustment in infinitesimal increments throughout the speed range of interest. It is found that because of the very light loading involved in rotating the indicator lamps, such a variable speed cone drive is able to provide a speed stability which is entirely adequate for the purpose, such as would not be the case if substantial amounts of power were attempted to be transmitted through the drive. It is also found that because of these special circumstances, negligible wear occurs on the friction surfaces, so that their maintenance and replacement is not required over long periods of use. This is in marked contrast to the more familiar applications of friction drive, such as has been seen in the past in mine dinkys, for example, where the transmission of heavy power loads by variable speed friction drives resulted in intolerable maintenance problems due to wear of the friction surfaces.

Figure 5:
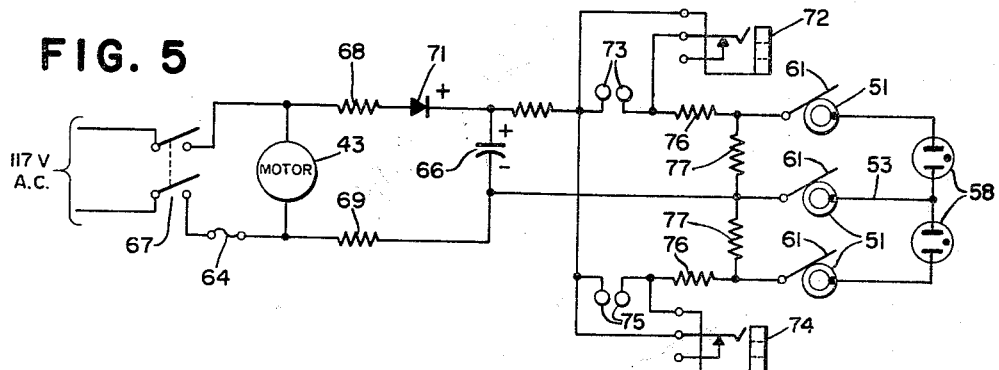
Figure 2:
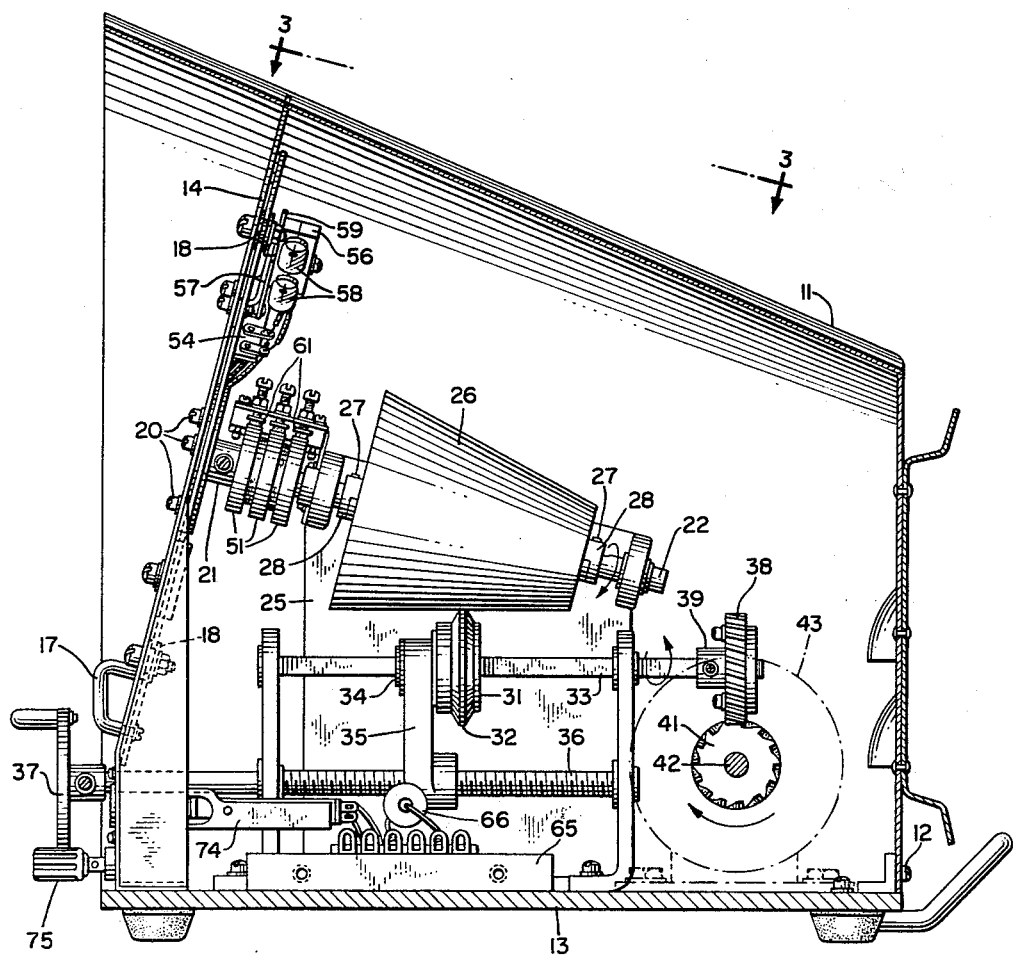
Figure 3:
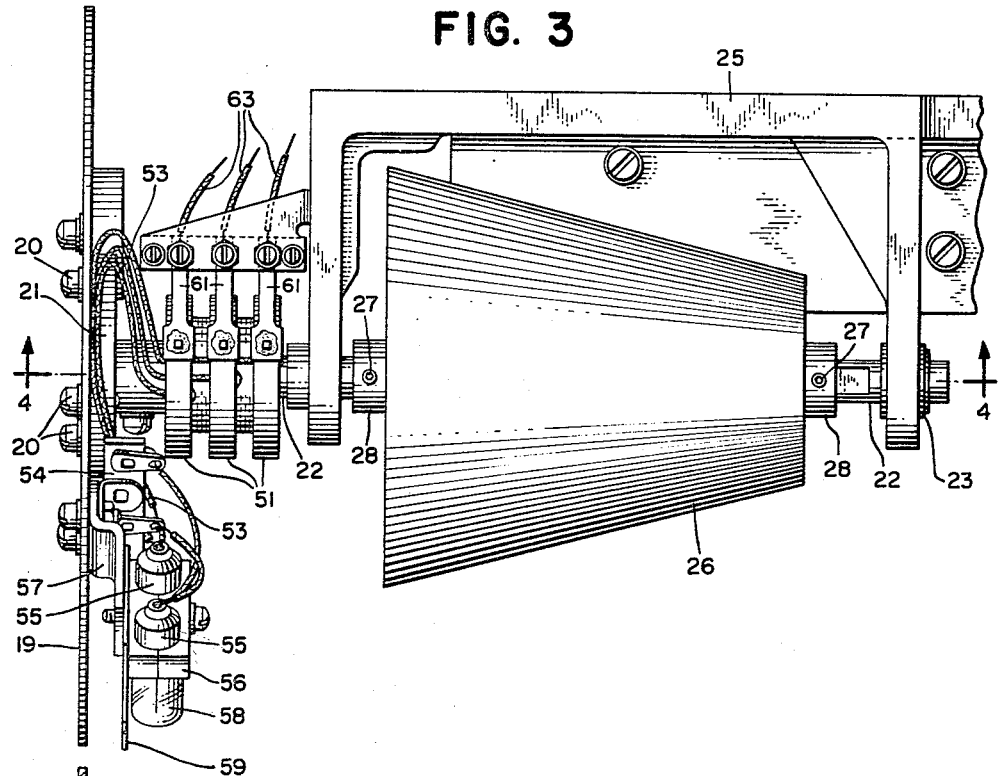
Figure 4:
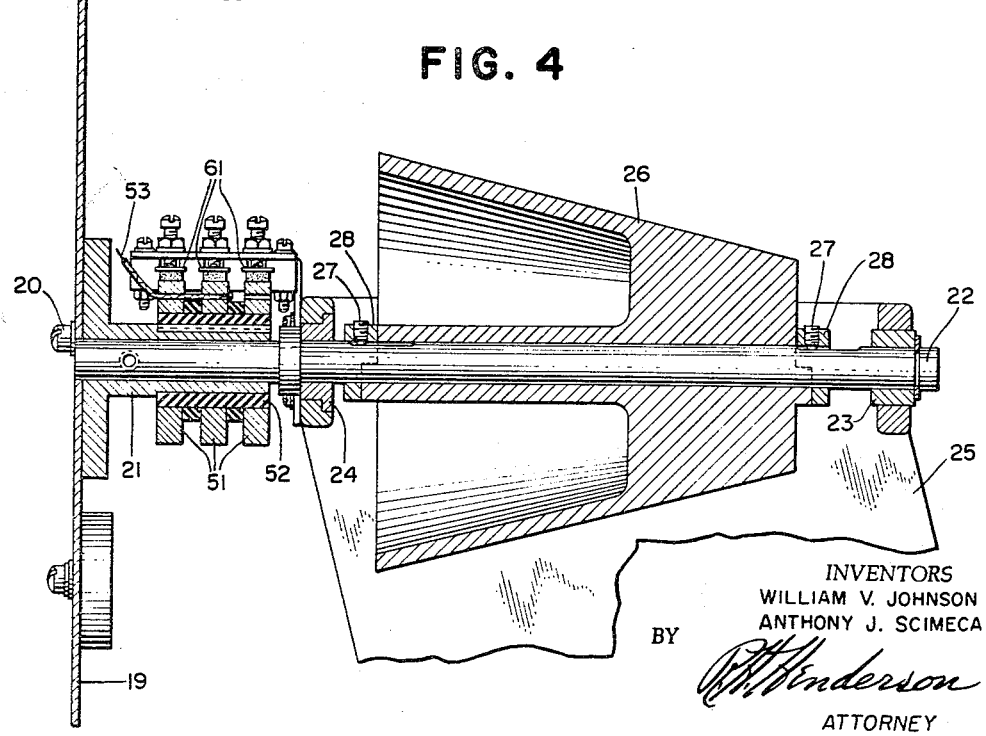

A more complete understanding of the invention may be had from the following detailed description of a specific illustrative example of the preferred embodiment thereof, comprising the best means known of practicing the invention, taken in connection with the drawings wherein:

FIG. 1 is a front view of the instrument;
FIG. 2 is a section taken on the line 2—2 of FIG. 1;
FIG. 3 is a view of an interior portion of FIG. 2 taken in the direction of arrows 3—3 of FIG. 2;
FIG. 4 is a section taken on the line 4—4 of FIG. 3; and
FIG. 5 is an electrical circuit diagram of the instant invention.

Referring now to the drawings, there is seen in FIG. 1 a cover 11 retained by screws 12 on base 13. A panel 14 having a large circular hole 15 cut therein retains a flat ring 16 rotatable behind this hole by means of a handle 17 in slippery plastic bushings such as 18, seen more clearly in FIG. 2. Ring 16 is graduated in several scales of circular measure as shown in part, and otherwise designated with appropriate lettering for the testing of telegraph circuitry. A disc 19 is mounted within the ring 16 by means of screws 20 on a hub 21 supported by means later to be described for rotation in the plane of ring 16 and panel 14.

Hub 21 is affixed to shaft 22 carried in a rear bearing 23 and a front thrust bearing 24 in the casting 25, as shown in section in FIG. 4, the said casting 25 being secured to base 13 as shown in FIG. 2.

Referring to FIG. 3, a cone 26 is secured to shaft 22 by set screws 27 in its hubs 28 and bears against a friction wheel 31 having a friction tread 32 of suitable durable friction material such as rubber or plastic seen in FIG. 2.

Wheel 31 is keyed to longitudinally slotted round shaft 33 for slidability therealong while being rotated thereby, and is journalled in a bearing 34 on a bracket 35 movable laterally by engagement with the threaded shaft 36 which is terminated by a crank wheel 37 positioned on front panel 14. Friction tread 32 is thus movable, by the turning of crank wheel 37, laterally across the face of cone 26, while at the same time being rotated by shaft 33 so as to rotate cone 26. Such adjustable lateral motion of tread 32 provides a range of speed ratios between shafts 22 and 33 which thus is adjustable in increments as small as desired by the turning of crank wheel 37.

Shaft 33 carries a mitre gear 38 on a hub 39 which is secured to the shaft, said gear mating with a similar gear 41 on the shaft 42 of motor 43 to be driven thereby. Motor 43 may be a motor such as an induction motor operated at full rated voltage so as to have a substantially constant speed, or it may be a speed controlled motor regulated by a centrifugal governor of well-known kind if greater stability of speed is desired, or, if as in most cases, the entire device is to be operated from a power line having accurately regulated frequency, a synchronous motor may be used.

Referring to FIG. 4, slip rings 51 are mounted on and insulated from the hub 21 by insulating material 52 and are connected by wires such as 53 through terminal strip 54 (of FIG. 3) to sockets 55, mounted by means of insulative block 56 on the bracket 57 which in turn is bolted to disc 19 for rotation therewith. A pair of glow lamps such as 58 occupy the sockets 55. A slotted metal mask for defining a radial light slit from each lamp is affixed to bracket 57, and may be seen in greater detail in FIG. 1.

Brushes such as 61 of FIG. 3 contact slip rings 51 and are connected by wires 63 to the components such as fuse 64, terminal strip 65, and capacitor 66 of FIG. 2 in the manner set forth in FIG. 5.

Switch 67 applies mains excitation through fuse 64 to motor 43 and through resistors 68 and 69 to the semiconductor rectifier 71 in series with capacitor 66 for purposes of charging it to a substantial value of D.C. voltage. A pair of symmetrical switching circuits provide a convenient pair of jacks 72 and 74 paralleled respectively by binding post pairs 73 and 75 for operating lamps 58 by connection to a distributor (switch) under test. Resistors 76 provide ballast, and resistors 77, prompt extinguishment of the lamps 58.

It will be observed that by the use of synchronous motor drive, or other sufficiently stable driving means as before described, in conjunction with the angular indexing of the crank wheel 37 by means of its off-center crank, rotational speeds, which can be calibrated in absolute units are obtained and as a consequence, the timing periods laid out as graduations 81 of FIG. 1 are also capable of providing absolute rather than merely relative measurements.

Under these circumstances no further synchronization of the device is required, and all need for synchronizing channels and circuitry is eliminated. This results in the production of a compact assembly of relatively nondeteriorating elements such that servicing problems are largely avoided and those remaining are much simplified.

It is further noteworthy that when the instant invention is used for the simultaneous comparison of two non-cognate functions, no shortening or lengthening of either function need occur because of the aforementioned inaccuracy introduced by image creep, since the absolute timing capability of the device renders it unnecessary to synchronize the display on either function.

Since the instant device provides the speed exactitude of a precise driving motor over a wide, continuously variable range of stable speeds, it will be apparent that the indexable angular scales 81 are particularly adapted to the intercomparison of a simultaneous display of plural functions with unusual versatility because of the wide range of printer speeds accommodated.

Although this invention has been described in terms of a specific illustrative example of the preferred embodiment thereof, various modifications and substitutions therein will occur to those skilled in the art which do not, however, depart from the essential spirit of the invention, and it is therefore intended that the invention shall be limited only by the appended claims.

We claim:

1. Telegraphic code interruption signal display means comprising a plurality of rotatably mounted and signal modulatable indicator lamps, means for rotating said lamps comprising a rotatable shaft in rigid connection therewith, a shaft-concentric driving cone affixed to said shaft, keyed wheel means having a friction driving surface engaging said driving cone and movable manually along the elements thereof during cone driving, driving wheel rotating means comprising a constant speed motor and a longitudinally keywayed driving wheel axle driven thereby and engaging said keyed driving wheel means, radial optical slit means for each said lamp mounted adjacent thereto, lamp modulation means comprising lamp-connected slip rings, a power supply connected thereto, and circuit means for energizing and connecting simultaneously a plurality of separate signal code circuit interruption devices to said slip rings for testing.

2. The device of claim 1 wherein said constant speed motor is a governor regulated induction motor.

3. The device of claim 1 wherein said constant speed motor is a synchronous induction motor.

4. The device of claim 1 wherein said constant speed motor is a compound direct current motor.

5. The device of claim 1 wherein said motor is an induction motor.

6. The device of claim 5 wherein there is an opaque disc mounted adjacent the plane of rotation of said lamps, for manual adjustment by rotation concentric with said shaft, overlapping said lamps, and having circumferential slits in alignment with said lamps, and graduated indicia for said slits.

7. Telegraph distributor test means comprising a purality of gas arc lamps adjacently radially mounted for rotation at constant speed in a circle, rotating means for said lamps comprising a speed adjuster of the friction cone and driving wheel type, said driving wheel being manually and threadedly adjustable along the cone, said speed adjuster having an output shaft which is connected to rotate the said lamps, and a constant speed motor connected to said driving wheel; means for causing said lamps to produce sharply defined commensurable light tracks comprising radial slit means affixed for traveling in front of each lamp, separate input slip ring means on said shaft connected to each of said lamps, power supply means having series ballast impedance means and shunt quenching impedance means for said lamps, and a calibrated, manually rotatable scale mounted adjacent the plane of rotation of said lamps, and having narrow light permeable circumferential portions in line with said slit means.

8. Signal distributor testing means comprising an induction motor having a constant speed characteristic, manually controllable speed regulating means comprising a cone and a friction roller engaging said cone, movable therealong and connected to said motor for rotation thereby, circumferential aperture means in a plane normal to the axis of said cone, a disc mounted for rotation behind said circumferential aperture means and connected to said cone, a plurality of luminous signal indicating means on said disc each having adjacent thereto radial slit means for augmenting angular definition of an indicated signal, graduations on said aperture means circumferentially movable with respect to said disc, and means to energize each of said signal indicating means through a separate one of a plurality of distributors.

9. Telegraph transmitter testing means comprising rotatable discharge lamp indicating means, a rotatable radial slit means mounted adjacent to each said indicating means, circumferentially adjustable circumferential slit means mounted adjacent the plane of rotation of said indicating means having a slit for each said indicating means and a set of angularly spaced-apart graduations adjacent to each slit, cone and roller manual speed adjusting means connected to rotate said indicating means, motor means having a substantially constant speed characteristic at relatively light load, connected to drive said speed adjusting means, and energization means to cause said indicating means to glow during an "on" pulse.

10. The device of claim 9 wherein said indicating means comprises a plurality of discharge lamps each having connection with said energization means for producing glow in a particular indicating means during an "on" pulse in a corresponding transmitter.

References Cited in the file of this patent
UNITED STATES PATENTS

| | | |
|---|---|---|
| 1,862,474 | Fluharty et al. | June 7, 1932 |
| 2,183,613 | Hanke et al. | Dec. 19, 1939 |
| 2,650,414 | Kreamer | Sept. 1, 1953 |
| 2,715,164 | Hufnagel | Aug. 9, 1955 |